(12) United States Patent
Nishioka et al.

(10) Patent No.: US 8,640,442 B2
(45) Date of Patent: Feb. 4, 2014

(54) EXHAUST PURIFICATION DEVICE OF INTERNAL COMBUSTION ENGINE

(75) Inventors: Hiromasa Nishioka, Susono (JP); Takamitsu Asanuma, Mishima (JP); Kohei Yoshida, Gotenba (JP); Yuka Nakata, Susono (JP)

(73) Assignee: Toyota Jidosha Kabushiki Kaisha, Toyota-shi (JP)

( * ) Notice: Subject to any disclaimer, the term of this patent is extended or adjusted under 35 U.S.C. 154(b) by 788 days.

(21) Appl. No.: 12/937,036

(22) PCT Filed: Apr. 7, 2009

(86) PCT No.: PCT/JP2009/057422
§ 371 (c)(1),
(2), (4) Date: Oct. 8, 2010

(87) PCT Pub. No.: WO2009/125865
PCT Pub. Date: Oct. 15, 2009

(65) Prior Publication Data
US 2011/0036073 A1   Feb. 17, 2011

(30) Foreign Application Priority Data
Apr. 11, 2008   (JP) ................. 2008-103912

(51) Int. Cl.
*F01N 3/00* (2006.01)
*F01N 3/10* (2006.01)

(52) U.S. Cl.
USPC .............. 60/285; 60/286; 60/295; 60/297; 60/301

(58) Field of Classification Search
USPC ............ 60/285, 286, 295, 297, 301
See application file for complete search history.

(56) References Cited

U.S. PATENT DOCUMENTS

| 6,988,360 B2* | 1/2006 | Kimura et al. ............ 60/286 |
| 7,506,502 B2* | 3/2009 | Nakano et al. ........... 60/285 |
| 7,730,719 B2* | 6/2010 | Yoshida .................. 60/286 |

(Continued)

FOREIGN PATENT DOCUMENTS

| JP | 2000 80947 | 3/2000 |
| JP | 2005 133610 | 5/2005 |
| JP | 2006 144624 | 6/2006 |

(Continued)

OTHER PUBLICATIONS

Supplementary Search Report issued May 2, 2011 in European Patent Application No. 09729400.3-2321 / 2280156.
International Search Report issued Jul. 14, 2009 in PCT/JP09/57422 filed Apr. 7, 2009.

*Primary Examiner* — Thomas Denion
*Assistant Examiner* — Diem Tran
(74) *Attorney, Agent, or Firm* — Oblon, Spivak, McClelland, Maier & Neustadt, L.L.P.

(57) ABSTRACT

In an internal combustion engine, an $SO_X$ trap catalyst (13) which traps $SO_X$ contained in the exhaust gas is arranged upstream of an $NO_X$ storing catalyst (15) in an engine exhaust passage. When the $NO_X$ storing catalyst (15) should release $NO_X$, auxiliary fuel is injected into a combustion chamber (2) at a combustible timing after the completion of injection of fuel into the combustion chamber (2) for generating the engine output. At this time, the auxiliary fuel is injected so that the air-fuel ratio A/F of the combustion gas in the combustion chamber (2) does not become below a minimum allowable air-fuel ratio M where $SO_X$ trapped at the $SO_X$ trap catalyst (13) will not be released.

9 Claims, 9 Drawing Sheets

(56) References Cited

U.S. PATENT DOCUMENTS

| | | |
|---|---|---|
| 8,256,206 B2 * | 9/2012 | Wada et al. .................. 60/286 |
| 2005/0060987 A1 * | 3/2005 | Nakano et al. ............... 60/285 |
| 2006/0064969 A1 | 3/2006 | Yoshida et al. |

FOREIGN PATENT DOCUMENTS

| | | |
|---|---|---|
| JP | 2008 57368 | 3/2008 |
| JP | 2008 57376 | 3/2008 |
| WO | WO 2005/040571 A1 | 5/2005 |

* cited by examiner

EXHAUST PURIFICATION DEVICE OF INTERNAL COMBUSTION ENGINE

TECHNICAL FIELD

The present invention relates to an exhaust purification device of an internal combustion engine.

BACKGROUND ART

Known in the art is an internal combustion engine arranging in an engine exhaust passage an $NO_X$ storing catalyst which stores $NO_X$ contained in exhaust gas when the air-fuel ratio of inflowing exhaust gas is lean and releases stored $NO_X$ when the air-fuel ratio of the inflowing exhaust gas becomes the stoichiometric air-fuel ratio or rich. In this internal combustion engine, $NO_X$ generated when fuel is burned under a lean air-fuel ratio is stored in the $NO_X$ storing catalyst. On the other hand, if an $NO_X$ storage ability of the $NO_X$ storing catalyst approaches saturation, the air-fuel ratio of the exhaust gas is temporarily made rich whereby $NO_X$ is released from the $NO_X$ storing catalyst and reduced.

In this regard, fuel contains sulfur. Therefore, the exhaust gas contains $SO_X$. This $SO_X$ is stored together with the $NO_X$ in the $NO_X$ storing catalyst. In this regard, this $SO_X$ is not released from the $NO_X$ storing catalyst by just making the air-fuel ratio of the exhaust gas rich. Therefore, the amount of $SO_X$ stored in the $NO_X$ storing catalyst gradually increases. As a result, the amount of $NO_X$ amount which can be stored gradually ends up falling.

Therefore, known in the art is an internal combustion engine in which $SO_X$ is prevented from being sent into the $NO_X$ storing catalyst by arranging an $SO_X$ trap catalyst upstream of the $NO_X$ storing catalyst in the engine exhaust passage (see Patent Literature 1). In this internal combustion engine, the $SO_X$ contained in the exhaust gas is trapped by the $SO_X$ trap catalyst and therefore the $SO_X$ is prevented from flowing into the $NO_X$ storing catalyst. As a result, it is possible to prevent a drop in the storage ability of $NO_X$ due to the storage of $SO_X$.

In this regard, in this $SO_X$ trap catalyst, when the temperature of the $SO_X$ trap catalyst rises, if the air-fuel ratio of the exhaust gas flowing into the $SO_X$ trap catalyst is made rich, $SO_X$ will end up being released from the $SO_X$ trap catalyst. Further, in this $SO_X$ trap catalyst, when the concentration of $SO_X$ trapped near the surface of the $SO_X$ trap catalyst rises, even if the temperature of the $SO_X$ trap catalyst is not high, if the air-fuel ratio of the exhaust gas flowing into the $SO_X$ trap catalyst is made rich, $SO_X$ will end up being released from the $SO_X$ trap catalyst.

Therefore, in the above-mentioned internal combustion engine, the exhaust gas flowing into the $SO_X$ trap catalyst is maintained constantly lean so that that $SO_X$ is not released from the $SO_X$ trap catalyst and, when the $NO_X$ storing catalyst should release $NO_X$, a fuel feed valve arranged downstream of the $SO_X$ trap catalyst and upstream of the $NO_X$ storing catalyst feeds fuel to make the air-fuel ratio of the exhaust gas flowing into the $NO_X$ storing catalyst rich.

CITATION LIST

Patent Literature

Patent Literature 1: Japanese Patent Publication (A) No. 2005-133610

SUMMARY OF INVENTION

Technical Problem

In this regard, the $NO_X$ released from an $NO_X$ storing catalyst is reduced by reducing components such as hydrocarbons and carbon monoxide contained in the exhaust gas. In this case, carbon monoxide has a powerful reducing action against $NO_X$ even when the temperature of the $NO_X$ storing catalyst is low, but hydrocarbons do not exert a strong reducing action against $NO_X$ unless the temperature of the $NO_X$ storing catalyst rises by a certain extent. On the other hand, as explained above, when the $NO_X$ storing catalyst should release $NO_X$, if feeding fuel from a fuel feed valve arranged upstream of the $NO_X$ storing catalyst, the majority of the reducing components contained in the exhaust gas becomes hydrocarbons. Therefore, in this case, the $NO_X$ released from the $NO_X$ storing catalyst is not sufficiently reduced unless the temperature of the $NO_X$ storing catalyst rises to a certain extent and therefore a high $NO_X$ purification rate cannot be obtained unless the temperature of the $NO_X$ storing catalyst rises to a certain extent.

On the other hand, as a method for making the air-fuel ratio of the exhaust gas flowing into the $NO_X$ storing catalyst rich so as to make the $NO_X$ storing catalyst release $NO_X$, there is the method of injecting auxiliary fuel into a combustion chamber at a combustible timing after the completion of injection of fuel into the combustion chamber for generating the engine output. With this method, the air-fuel ratio of the combustion gas in the combustion chamber is made rich so that the air-fuel ratio of the exhaust gas flowing into the $NO_X$ storing catalyst is made rich. In this case, the auxiliary fuel is made to burn in a state with little oxygen, so a large amount of carbon monoxide with its strong reducing action is produced. As a result, even if the temperature of the $NO_X$ storing catalyst is low, the $NO_X$ released from the $NO_X$ storing catalyst is reduced well and therefore even if the temperature of the $NO_X$ storing catalyst is low, a high $NO_X$ purification rate is obtained.

In this regard, by injecting auxiliary fuel into the combustion chamber in this way so as to make the air-fuel ratio of the combustion gas in the combustion chamber rich, the air-fuel ratio of the exhaust gas flowing into the $SO_X$ trap catalyst becomes rich. In this regard, when making the air-fuel ratio of the combustion gas rich so as to make the air-fuel ratio of the exhaust gas flowing into the $NO_X$ storing catalyst rich in this way, it was learned that even if making the air-fuel ratio of the exhaust gas flowing into the $NO_X$ storing catalyst rich, there is a broad region where the $SO_X$ trap catalyst will not release the $SO_X$.

An object of the present invention is to provide an exhaust purification action of an internal combustion engine which lowers the air-fuel ratio of the combustion gas without inviting release of $SO_X$ from the $SO_X$ trap catalyst based on the found $SO_X$ release region.

Solution to Problem

According to the present invention, there is provided an exhaust purification device of an internal combustion engine arranging in an engine exhaust passage an $SO_X$ trap catalyst for trapping $SO_X$ contained in exhaust gas and arranging in the exhaust passage downstream of the $SO_X$ trap catalyst an exhaust purification catalyst, wherein the device is provided with an auxiliary fuel injecting means for injecting auxiliary fuel into a combustion chamber at a combustible timing after completion of injection of fuel into the combustion chamber for generating engine output, a minimum allowable air-fuel ratio comprised of an air-fuel ratio of a combustion gas in the combustion chamber falling when an auxiliary fuel is injected and where $SO_X$ trapped in the $SO_X$ trap catalyst is not released is found in advance, when the air-fuel ratio of the combustion gas will not fall to the minimum allowable air-fuel ratio even when injecting an amount of auxiliary fuel required for a purification processing of the exhaust purification catalyst, the required amount of auxiliary fuel is injected, and when the air-fuel ratio of the combustion gas will fall to below the minimum allowable air-fuel ratio when injecting the amount of auxiliary fuel required for the purification processing of the exhaust purification catalyst, the injected amount of auxiliary fuel is reduced from the required amount to prevent the air-fuel ratio of the combustion gas from falling to below the minimum allowable air-fuel ratio.

Advantageous Effects of Invention

The release of $SO_X$ from the $SO_X$ trap catalyst can be prevented.

EMBODIMENTS OF INVENTION

Figure 1:
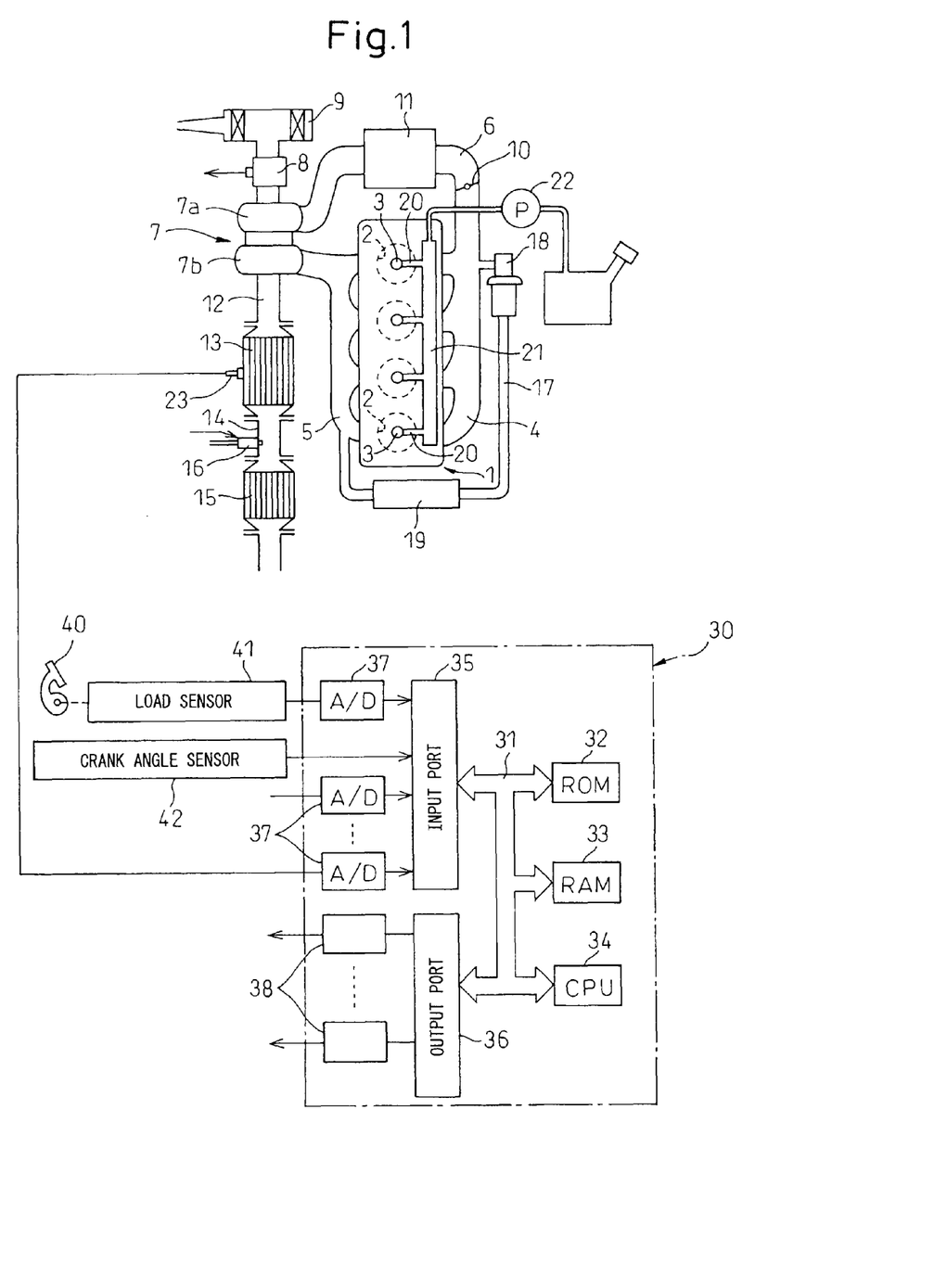
FIG. 1 is an overall view of a compression ignition type internal combustion engine.

FIG. 1 shows an overview of a compression ignition type internal combustion engine.

Referring to FIG. 1, 1 indicates an engine body, 2 a combustion chamber of each cylinder, 3 an electronically controlled fuel injector for injecting fuel into each combustion chamber 2, 4 an intake manifold, and 5 an exhaust manifold. The intake manifold 4 is connected through an intake duct 6 to the outlet of a compressor 7a of an exhaust turbocharger 7. The inlet of the compressor 7a is connected to an air cleaner 9 via an intake an amount detector 8. Inside the intake duct 6 is arranged a throttle valve 10 driven by a step motor. Further, around the intake duct 6 is arranged a cooling device (intercooler) 11 for cooling the intake air flowing through the inside of the intake duct 6. In the embodiment shown in FIG. 1, the engine cooling water is guided into the cooling device 11. The engine cooling water cools the intake air.

On the other hand, the exhaust manifold 5 is connected to the inlet of an exhaust turbine 7b of the exhaust turbocharger 7, while the outlet of the exhaust turbine 7b is connected through an exhaust pipe 12 to the inlet of an $SO_X$ trap catalyst 13. Further, the outlet of the $SO_X$ trap catalyst 13 is connected through an exhaust pipe 14 to an exhaust purification catalyst 15. In the embodiment shown in FIG. 1, the exhaust purification catalyst 15 is comprised of an $NO_X$ storing catalyst. A fuel feed valve 16 is arranged in the exhaust pipe 14 which is located downstream of the $SO_X$ trap catalyst 13 and upstream of the $NO_X$ storing catalyst 15. Note that, for example, a particulate filter carrying a $NO_X$ storing catalyst may be used as the exhaust purification catalyst 15.

The exhaust manifold 5 and the intake manifold 4 are interconnected through an exhaust gas recirculation (hereinafter referred to as an "EGR") passage 17. The EGR passage 17 is provided with an electronically controlled EGR control valve 18. Further, around the EGR passage 17 is arranged a cooling device 19 for cooling the EGR gas flowing through the inside of the EGR passage 17. In the embodiment shown in FIG. 1, the engine cooling water is guided into the cooling device 19. The engine cooling water cools the EGR gas. On the other hand, each fuel injector 3 is connected through a fuel feed tube 20 to a common rail 21. This common rail 21 is supplied with fuel from an electronically controlled variable discharge fuel pump 22. The fuel supplied into the common rail 21 is supplied through each fuel feed tube 20 to the fuel injector 3.

An electronic control unit 30 is comprised of a digital computer provided with a read only memory (ROM) 32, a random access memory (RAM) 33, a microprocessor (CPU) 34, an input port 35, and an output port 36 all connected to each other by a bidirectional bus 31. The $SO_X$ trap catalyst 13 is provided with a temperature sensor 23 for detecting the temperature of the $SO_X$ trap catalyst 13. The output signals of the temperature sensor 21 and the intake an amount detecter 8 are input through corresponding AD converters 37 to the input port 35. Further, an accelerator pedal 40 has a load sensor 41 generating an output voltage proportional to the amount of depression L of the accelerator pedal 40 connected to it. The output voltage of the load sensor 41 is input through a corresponding AD converter 37 to the input port 35. Further, the input port 35 has a crank angle sensor 42 generating an output pulse each time the crankshaft turns for example by 15 degrees connected to it. On the other hand, the output port 36 is connected through corresponding drive circuits 38 to the fuel injectors 3, step motor for driving the throttle valve 10, fuel feed valve 16, EGR control valve 18, and fuel pump 22.

Figure 2:
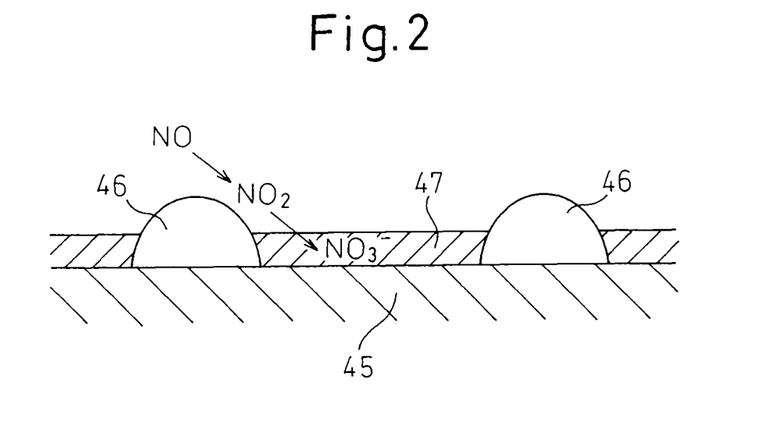
FIG. 2 is a cross-sectional view of a surface part of a catalyst carrier of an $NO_X$ storing catalyst.

First, explaining the $NO_X$ storing catalyst 15 shown in FIG. 1, a catalyst carrier comprised of, for example, alumina is carried on the substrate of the $NO_X$ storing catalyst 15, and FIG. 2 schematically shows the cross-section of the surface part of this catalyst carrier 45. As shown in FIG. 2, the catalyst carrier 45 carries a precious metal catalyst 46 diffused on its surface. Further, the catalyst carrier 45 is formed with a layer of an $NO_X$ absorbent 47 on its surface.

In this embodiment of the present invention, platinum Pt is used as the precious metal catalyst 46. As the ingredient forming the $NO_X$ absorbent 47, for example, at least one element selected from potassium K, sodium Na, cesium Cs, or another alkali metal, barium Ba, calcium Ca, or another alkali earth, lanthanum La, yttrium Y, or another rare earth may be used.

If the ratio of the air and fuel (hydrocarbons) supplied to the engine intake passage, combustion chambers 2, and exhaust passage upstream of the $NO_X$ storing catalyst 15 is referred to as the "air-fuel ratio of the exhaust gas", the $NO_X$ absorbent 47 performs an $NO_X$ absorption and release action of storing the $NO_X$ when the air-fuel ratio of the exhaust gas is lean and releasing the stored $NO_X$ when the oxygen concentration in the exhaust gas falls.

That is, if explaining this taking as an example the case of using barium Ba as the ingredient forming the $NO_X$ absorbent 47, when the air-fuel ratio of the exhaust gas is lean, that is, when the oxygen concentration in the exhaust gas is high, the $NO_X$ contained in the exhaust gas is oxidized on the platinum Pt 46 such as shown in FIG. 2 to become $NO_2$, then is absorbed in the $NO_X$ absorbent 47 and diffuses in the $NO_X$ absorbent 47 in the form of nitric acid ions $NO_3^-$ while bonding with the barium carbonate $BaCO_3$. In this way, the $NO_X$ is absorbed in the $NO_X$ absorbent 47. So long as the oxygen concentration in the exhaust gas is high, $NO_2$ is produced on the surface of the platinum Pt 46. So long as the $NO_X$ absorbing capability of the $NO_X$ absorbent 47 is not saturated, the $NO_2$ is absorbed in the $NO_X$ absorbent 47 and nitric acid ions $NO_3^-$ are produced.

As opposed to this, if the air-fuel ratio of the exhaust gas flowing into the $NO_X$ storing catalyst 15 is made rich or the stoichiometric air-fuel ratio, since the oxygen concentration in the exhaust gas falls, the reaction proceeds in the reverse direction ($NO_3^- \rightarrow NO_2$) and therefore the nitric acid ions $NO_3^-$ in the $NO_X$ absorbent 47 are released from the $NO_X$ absorbent 47 in the form of $NO_2$. Next, the released $NO_X$ is reduced by the unburned hydrocarbons or CO included in the exhaust gas.

In this way, when the air-fuel ratio of the exhaust gas is lean, that is, when burning fuel under a lean air-fuel ratio, the $NO_X$ in the exhaust gas is absorbed in the $NO_X$ absorbent 47. However, if continuing to burn fuel under a lean air-fuel ratio, during that time the $NO_X$ absorbing capability of the $NO_X$ absorbent 47 will end up becoming saturated and therefore $NO_X$ will end up no longer being able to be absorbed by the $NO_X$ absorbent 47. Therefore, in this embodiment according to the present invention, before the absorbing capability of the $NO_X$ absorbent 47 becomes saturated, the air-fuel ratio of the exhaust gas flowing into the $NO_X$ storing catalyst 15 is temporarily made rich to thereby release the $NO_X$ from the $NO_X$ absorbent 47.

However, exhaust gas contains $SO_X$, that is, $SO_2$. When this $SO_2$ flows into the $NO_X$ storing catalyst 15, this $SO_2$ is oxidized at the platinum Pt 46 and becomes $SO_3$. Next, this $SO_2$ is absorbed in the $NO_X$ absorbent 47 and bonds with the barium carbonate $BaCO_3$ while diffusing in the $NO_X$ absorbent 47 in the form of sulfate ions $SO_4^{2-}$ to produce the stable sulfate $BaSO_4$. However, the $NO_X$ absorbent 47 has a strong basicity, so this sulfate $BaSO_4$ is stable and hard to decompose. If just making the air-fuel ratio of the exhaust gas rich, the sulfate $BaSO_4$ will remain without being decomposed. Therefore, in the $NO_X$ absorbent 47, the sulfate $BaSO_4$ will increase along with the elapse of time and therefore the amount of $NO_X$ which the $NO_X$ absorbent 47 can absorb will fall along with the elapse of time.

In this case, however, if raising the temperature of the $NO_X$ storing catalyst 15 to the $SO_X$ release temperature of 600° C. or more and in that state making the air-fuel ratio of the exhaust gas flowing into the $NO_X$ storing catalyst 15 rich, $SO_X$ will be released from the $NO_X$ absorbent 47. However, in this case, $SO_X$ will only be released from the $NO_X$ absorbent 47 a little at a time. Therefore, for release of all of the absorbed $SO_X$ from the $SO_X$ absorbent 47, the air-fuel ratio must be made rich for a long time and therefore there is the problem that a large amount of fuel or a reducing agent becomes necessary. Further, the $SO_X$ released from the $SO_X$ absorbent 47 is exhausted into the atmosphere. This is also not preferable.

Therefore, in the present invention, the $SO_X$ trap catalyst 13 is arranged upstream of the $NO_X$ storing catalyst 15 and this $SO_X$ trap catalyst 13 is used to trap the $SO_X$ contained in the exhaust gas and thereby prevent $SO_X$ from flowing into the $NO_X$ storing catalyst 15. Next, this $SO_X$ trap catalyst 13 will be explained.

Figure 3:
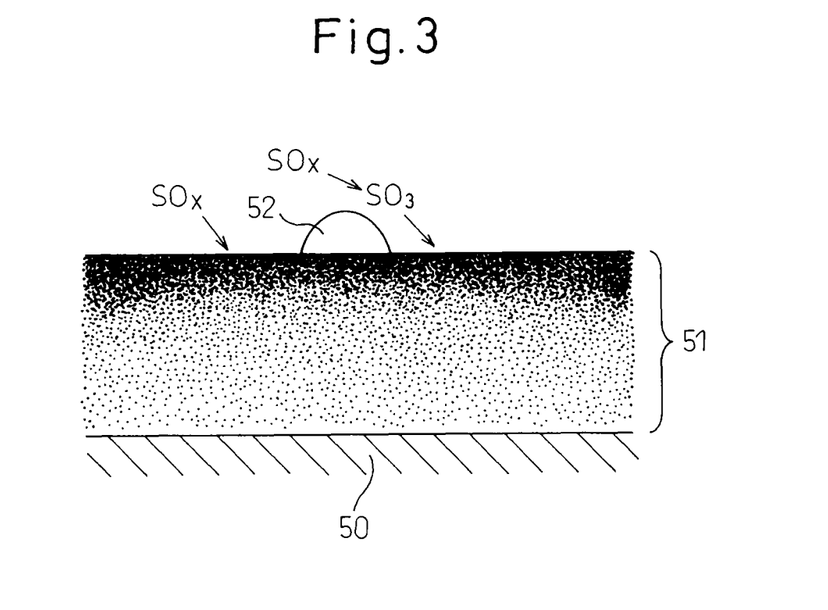
FIG. 3 is a cross-sectional view of a surface part of a catalyst carrier of an $SO_X$ trap catalyst.

The $SO_X$ trap catalyst 13 is comprised of for example a honeycomb structure monolithic catalyst and has a large number of exhaust gas through holes extending straight in the axial direction of the $SO_X$ trap catalyst 13. When forming the $SO_X$ trap catalyst 13 from a honeycomb structure monolithic catalyst in this way, the inside peripheral walls of the exhaust gas through holes carry a catalyst carrier comprised of for example alumina. FIG. 3 schematically shows the cross-section of the surface part of this catalyst carrier 50. As shown in FIG. 3, the catalyst carrier 50 is formed with a coated layer 51 on its surface. Further, the coated layer 51 carries a precious metal catalyst 52 diffused on its surface.

In this embodiment shown in FIG. 3, the precious metal catalyst such as platinum is used as the catalyst 52. As the ingredient forming the coated layer 51, for example, at least one element selected from potassium K, sodium Na, cesium Cs, or another alkali metal, barium Ba, calcium Ca, or another alkali earth, lanthanum La, yttrium Y, or another rare earth may be used. That is, the coated layer 51 of the $SO_X$ trap catalyst 13 exhibits a strong basicity.

Therefore, the $SO_X$ contained in the exhaust gas, that is, the $SO_2$, is oxidized at the platinum Pt 52 as shown in FIG. 3, then is trapped in the coated layer 51. That is, the $SO_2$ diffuses in the coated layer 51 in the form of sulfate ions $SO_4^{2-}$ to form a sulfate. Note that as explained above, the coated layer 51 exhibits a strong basicity. Therefore, part of the $SO_2$ contained in the exhaust gas is directly trapped in the coated layer 51 as shown in FIG. 3.

The concentration in the coated layer 51 in FIG. 3 shows the concentration of trapped $SO_X$. As will be understood from FIG. 3, the concentration of $SO_X$ in the coated layer 51 is highest near the surface of the coated layer 51 and gradually becomes lower the further deeper. If the $SO_X$ concentration near the surface of the coated layer 51 becomes high, the basicity of the surface of the coated layer 51 becomes weaker and the $SO_X$ trap capability becomes weaker. In a state like this, if the temperature of the $SO_X$ trap catalyst 13 is raised under a lean air-fuel ratio of the exhaust gas, the $SO_X$ trap rate is restored.

That is, if raising the temperature of the $SO_X$ trap catalyst 13 under a lean air-fuel ratio of the exhaust gas, the $SO_X$ concentrated near the surface of the coated layer 51 diffuses toward the deep part of the coated layer 51 so that the $SO_X$ concentration in the coated layer 51 becomes even. That is, the sulfate produced in the coated layer 51 changes from an unstable state concentrated near the surface of the coated layer 51 to a stable state evenly diffused across the entirety of the inside of the coated layer 51. If the $SO_X$ present near the surface of the coated layer 51 diffuses toward the deep part of the coated layer 51, the concentration of $SO_X$ near the surface of the coated layer 51 will fall. Therefore, the $SO_X$ trap rate will be restored.

Figure 4A:
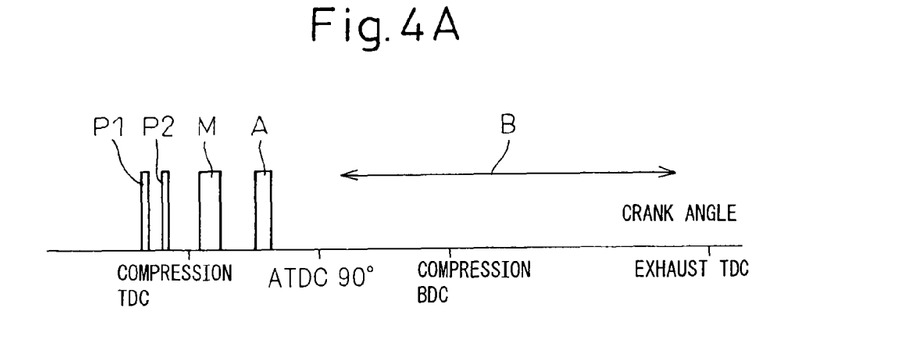
FIGS. 4A, 4B, and 4C are views for explaining the injection timing of auxiliary fuel.

Next, referring to FIGS. 4A, 4B, and 4C, the relationship between the injection timing of auxiliary fuel injected when making the $NO_X$ storing catalyst 15 release $NO_X$ and the $NO_X$ purification rate will be explained. FIG. 4A shows the timing of fuel injection from the fuel injector 3 to the combustion chamber 2. In the example shown in FIG. 4A, for generating engine output, several pilot injections P1 and P2 are performed before compression top dead center TDC, while the main injection M is performed near compression top dead center TDC.

On the other hand, in the present invention, as shown by A in FIG. 4A, auxiliary fuel is injected into the combustion chamber 2 at a combustible timing after the completion of fuel injections P1, P2, and M into the combustion chamber 2 for generating engine output. As will be understood from FIG. 4A, the injection timing of this auxiliary fuel A is set to a timing in the range of 90 degrees after compression top dead center TDC where the fuel does not contribute much at all to the engine output.

Figure 4B:
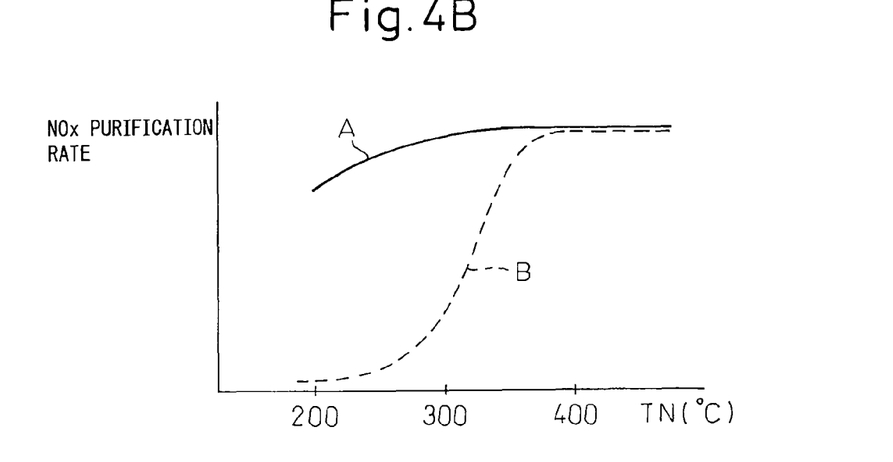
Figure 4C:
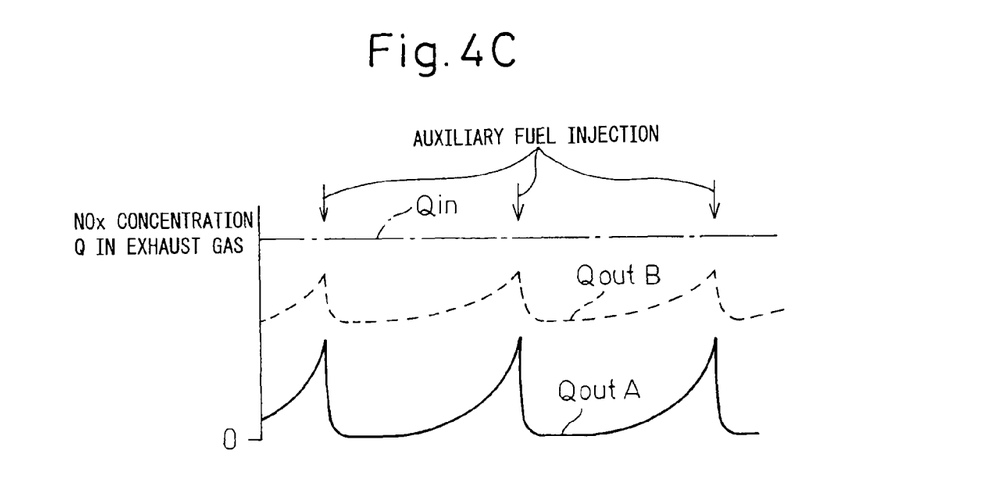

On the other hand, FIG. 4B shows the relationship between the temperature TN of the $NO_X$ storing catalyst 15 and the $NO_X$ purification rate, while FIG. 4C shows the $NO_X$ concentration Qin in the exhaust gas flowing into the $NO_X$ storing catalyst 15 at the time of a low temperature and the $NO_X$ concentrations Qout A and Qout B in the exhaust gas flowing out from the $NO_X$ storing catalyst 15. A in FIG. 4B and Qout A in FIG. 4C show the case where auxiliary fuel is injected at the timing shown by A in FIG. 4A, while B in FIG. 4B and Qout B in FIG. 4C show the case where auxiliary fuel is injected at the timing shown by B in FIG. 4A, that is, in the latter half of the expansion stroke or in the middle of the exhaust stroke.

In FIG. 4A, if main injection M is performed, the majority of the oxygen in the combustion chamber 2 is consumed. Therefore, if auxiliary fuel A is injected, this auxiliary fuel A will be burned in a state with insufficient oxygen and therefore a large amount of carbon monoxide will be produced. This carbon monoxide has a strong reducing action with respect to the $NO_X$ released from the $NO_X$ storing catalyst 15, therefore the $NO_X$ will be immediately reduced by the carbon monoxide when it is released, so $NO_X$ will be successively released from the $NO_X$ storing catalyst 15. As a result, as shown in FIG. 4C, the $NO_X$ concentration Qout A at the time of a low temperature will become lower and therefore, as shown by A in FIG. 4B, a high $NO_X$ purification rate will be obtained even at the time of a low temperature.

On the other hand, if auxiliary fuel is injected at the timing shown by B in FIG. 4A, this auxiliary fuel B will be broken down into small molecules, but will not burn much at all. Therefore, at this time, the small molecular weight hydrocarbons will increase, but the carbon monoxide will not increase much at all. In this case, hydrocarbons have a weaker reducing action compared with carbon monoxide, therefore, in this case, as shown in FIG. 4C, the $NO_X$ concentration Qout B at the time of a low temperature will become higher, so as shown by B in FIG. 4B, the $NO_X$ purification rate at the time of a low temperature will fall.

As stated above, compared with when injecting auxiliary fuel at the timing shown by B in FIG. 4A, injecting it at the timing shown by A results in the $NO_X$ purification rate at the time of a low temperature becoming higher. Therefore, in the present invention, as shown by A in FIG. 4A, auxiliary fuel is injected into the combustion chamber at a combustible timing after the completion of the injection of fuel to the combustion chamber 2 for generating the engine output.

Figure 5A:
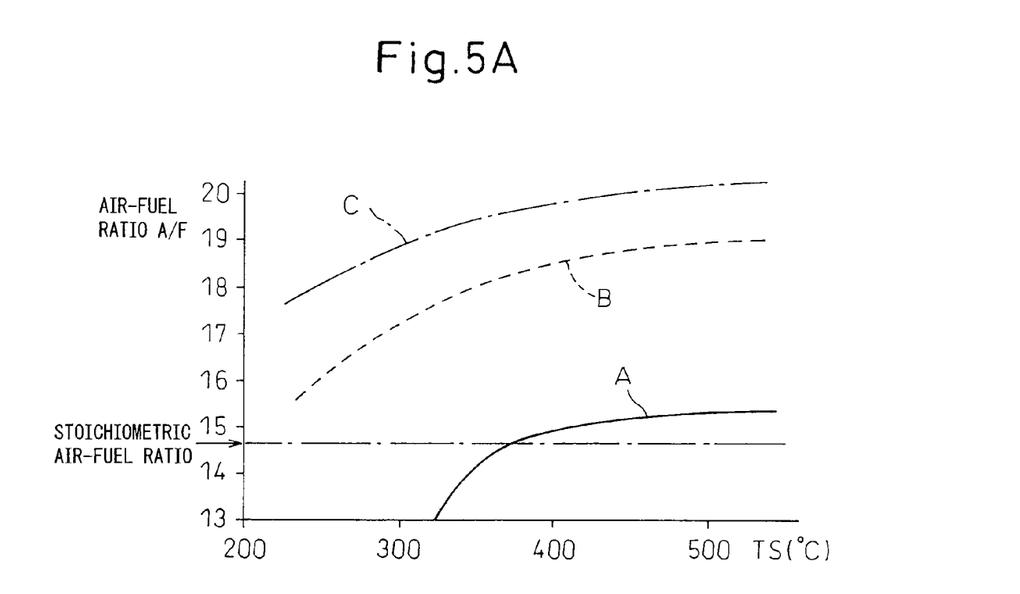
FIGS. 5A and 5B are views for explaining the minimum limit air-fuel ratio of combustion gas.
Figure 5B:
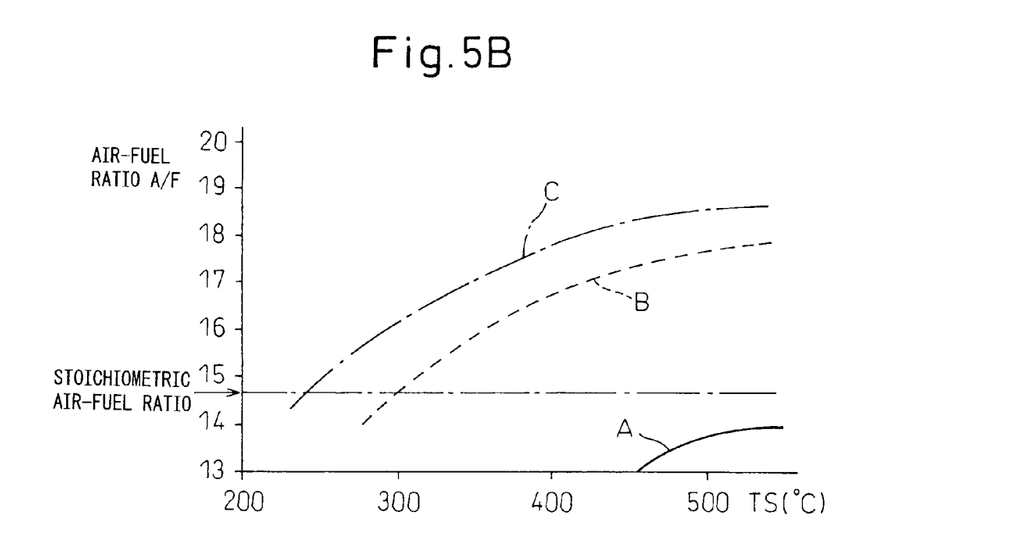

Now then, if injecting auxiliary fuel A, the air-fuel ratio A/F of the combustion gas in the combustion chamber 2 will fall. If the air-fuel ratio A/F falls down to a certain limit at this time, $SO_X$ will be released from the $SO_X$ trap catalyst 1. In FIGS. 5A and 5B, the solid line A shows the minimum limit air-fuel ratio where $SO_X$ will not be released from the $SO_X$ trap catalyst 13 when injecting the auxiliary fuel A. If the air-fuel ratio of the combustion gas when injecting the auxiliary fuel A becomes less than this minimum limit air-fuel ratio A, $SO_X$ will be released from the $SO_X$ trap catalyst 13.

Note that, in FIGS. 5A and 5B, the abscissa TS shows the temperature of the $SO_X$ trap catalyst 13. Further, FIG. 5A shows the case where the $SO_X$ trapped amount trapped in the $SO_X$ trap catalyst 13 is substantially in the saturated state, while FIG. 5B shows the case where the $SO_X$ trapped amount trapped in the $SO_X$ trap catalyst 13 is low.

On the other hand, in FIGS. 5A and 5B, the broken line B shows the minimum limit air-fuel ratio when injecting auxiliary fuel at the timing shown by B in FIG. 4A, while the chain line C shows the minimum limit air-fuel ratio when injecting fuel upstream of the $SO_X$ trap catalyst 13 inside the exhaust passage. When shown by the broken line B or chain line C, the exhaust gas contains relatively large hydrocarbon molecules. When these relatively large hydrocarbon molecules deposit on the surface of the $SO_X$ trap catalyst 13, the surface becomes extremely rich locally, so $SO_X$ ends up being released from the $SO_X$ trap catalyst 13. That is, as will be understood from FIGS. 5A and 5B, when shown by the broken line B or the chain line C, compared with when shown by the solid line A, $SO_X$ is released from the $SO_X$ trap catalyst 13 even when considerably lean.

In this way, if injecting auxiliary fuel at the timing shown by A in FIG. 4A, as shown in FIGS. 5A and 5B, the minimum limit air-fuel ratio becomes lower. In the case shown in FIG. 5A, when the temperature TS of the $SO_X$ trap catalyst 13 is relatively low, while in the case shown in FIG. 5B, over a broad temperature range of the $SO_X$ trap catalyst 13, it becomes possible to make the air-fuel ratio A/F of the combustion gas rich without causing the $SO_X$ trap catalyst 13 to release $SO_X$. As a result, a good $NO_X$ purification rate is obtained even at the time of a low temperature.

Figure 6:
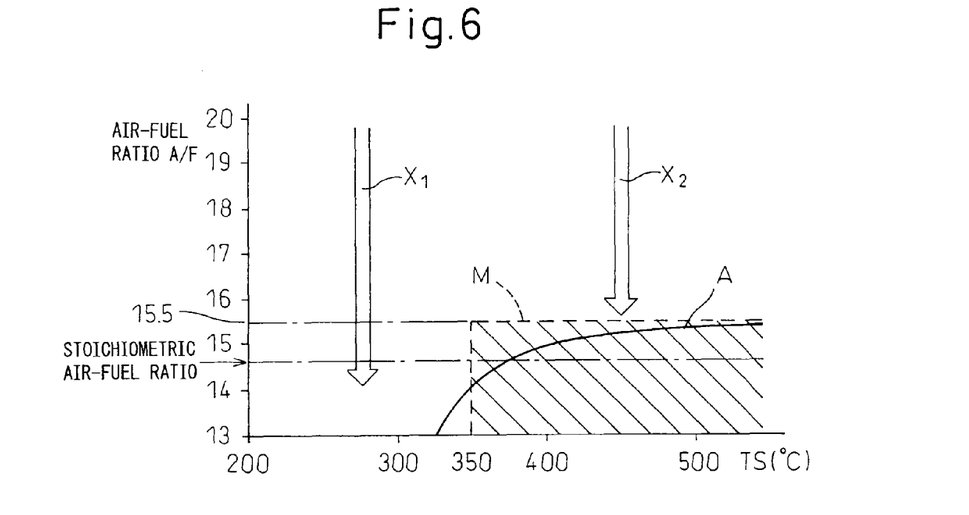
FIG. 6 is a view for explaining the minimum limit air-fuel ratio and minimum allowable air-fuel ratio of combustion gas.

Now then, as explained above, in FIG. 5A, the solid line A shows the minimum limit air-fuel ratio when the $SO_X$ trapped amount in the $SO_X$ trap catalyst 13 is substantially the saturated state. This minimum limit air-fuel ratio A is also shown in FIG. 6. When lowering the air-fuel ratio A/F of the combustion gas to a predetermined rich air-fuel ratio, if the air-fuel ratio A/F of the combustion gas does not become less than the minimum limit air-fuel ratio A shown in FIG. 6, the $SO_X$ trap catalyst 13 will not release $SO_X$ regardless of the magnitude of the $SO_X$ trapped amount at the $SO_X$ trap catalyst 13. Therefore, in the present invention, a minimum allowable air-fuel ratio having this minimum limit air-fuel ratio A as the upper limit or having an air-fuel ratio somewhat higher than this minimum limit air-fuel ratio A as the upper limit is determined in advance and the air-fuel ratio A/F of the combustion gas A/F is prevented from falling below this minimum allowable air-fuel ratio.

An example of this minimum allowable air-fuel ratio is shown in FIG. 6 by the broken line M. In the example shown in FIG. 6, it is prohibited for the air-fuel ratio A/F of the combustion gas to become less than the minimum allowable air-fuel ratio M shown by the hatching in FIG. 6. Specifically speaking, in the example shown in FIG. 6, the air-fuel ratio A/F of the combustion gas is kept from becoming less than 15.5 when the temperature TS of the $SO_X$ trap catalyst 13 is more than 350° C.

Figure 7:
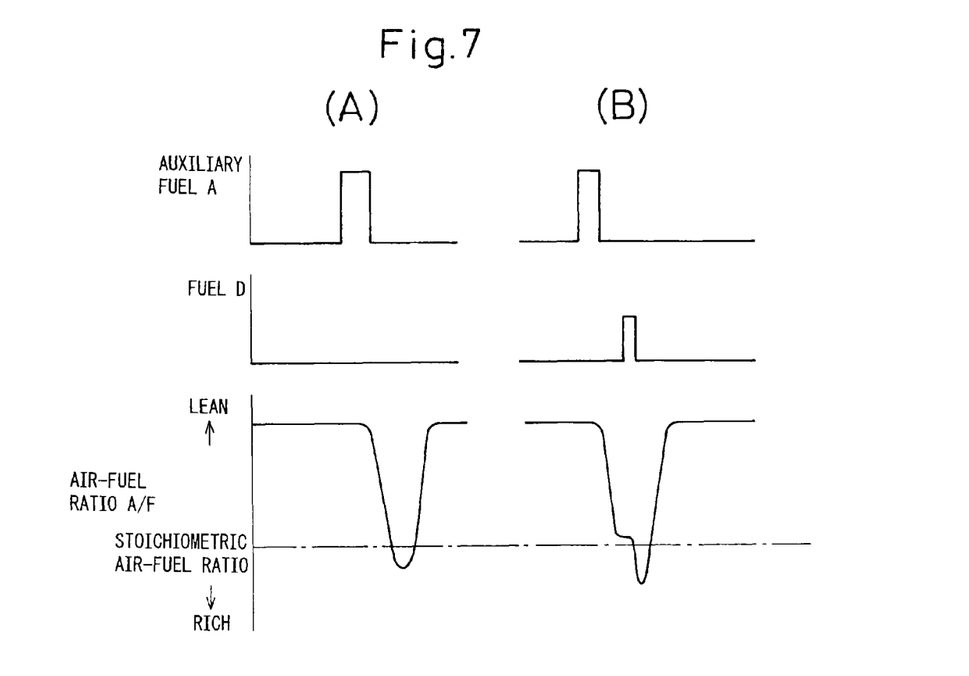
FIG. 7 is a view showing an auxiliary fuel A and a feed fuel D from a fuel feed valve etc.

As will be understood from FIG. 6, when the temperature TS of the $SO_X$ trap catalyst 13 is less than 350° C., as shown by the arrow $X_1$, even if the air-fuel ratio A/F of the combustion gas is made rich, the $SO_X$ trap catalyst 13 will not release $SO_X$. Therefore, at this time, as shown in FIG. 7A, auxiliary fuel A is injected to make the air-fuel ratio A/F of the combustion gas rich. As opposed to this, when the temperature TS of the $SO_X$ trap catalyst 13 is more than 350° C., as shown by the arrow $X_2$, the air-fuel ratio A/F of the combustion gas is lowered so as not to become less than the minimum allowable air-fuel ratio M. At this time, as shown in FIG. 7B, fuel D of the amount of the auxiliary fuel A insufficient for making the air-fuel ratio of the exhaust gas flowing into the $NO_X$ storing catalyst 15 rich is injected from the fuel injector 16.

That is, in the present invention, as shown in FIG. 6 by the arrow $X_1$ and in FIG. 7A, even if injecting the amount of auxiliary fuel A necessary for making the air-fuel ratio of the exhaust gas flowing into the $NO_X$ storing catalyst 15 rich for making the $NO_X$ storing catalyst 15 release $NO_X$, when the air-fuel ratio A/F of the fuel gas will not fall to the minimum allowable air-fuel ratio M, this required amount of auxiliary fuel A is injected to make the air-fuel ratio A/F of the combustion gas rich, while, as shown in FIG. 6 by the arrow $X_2$ and in FIG. 7B, if injecting the amount of auxiliary fuel necessary for making the air-fuel ratio of the exhaust gas flowing into the $NO_X$ storing catalyst 15 rich for making the $NO_X$ storing catalyst 15 release $NO_X$, when the air-fuel ratio A/F of the combustion gas will fall to the minimum allowable air-fuel ratio M, the injected amount of auxiliary fuel A is reduced from the above required amount so that the air-fuel ratio A/F of the combustion gas does not fall to below the minimum allowable air-fuel ratio M.

Furthermore, in the present invention, when the injected amount of the auxiliary fuel A is reduced from the required amount, the amount of decrease of the fuel is injected from the fuel feed valve 16.

Note that, if injecting the auxiliary fuel A, the exhaust temperature rises. Therefore for example the present invention can be applied even when injecting auxiliary fuel A for raising the temperature of the exhaust purification catalyst 15.

Therefore, including also the above case, in the present invention, a minimum allowable air-fuel ratio M comprised of the air-fuel ratio of the combustion gas in the combustion chamber 2 falling when the auxiliary fuel A is injected and where $SO_X$ trapped in the $SO_X$ trap catalyst 13 is not released is found in advance, when the air-fuel ratio A/F of the combustion gas will not fall to the minimum allowable air-fuel ratio M even if injecting the amount of auxiliary fuel required for the purification processing of the exhaust purification catalyst 15, this required amount of auxiliary fuel A is injected, and when the air-fuel ratio A/F of the combustion gas will fall to below the minimum allowable air-fuel ratio M if injecting the amount of auxiliary fuel required for the purification processing of the exhaust purification catalyst 15, the injected amount of auxiliary fuel A is reduced from the above required amount to prevent the air-fuel ratio A/F of the combustion gas from falling to below the minimum allowable air-fuel ratio M.

Note that, when the injected amount of the auxiliary fuel is reduced from the required amount in this way, the decreased amount of fuel is fed between the $SO_X$ trap catalyst 13 and exhaust purification catalyst 15 in the exhaust passage.

Figure 8A:
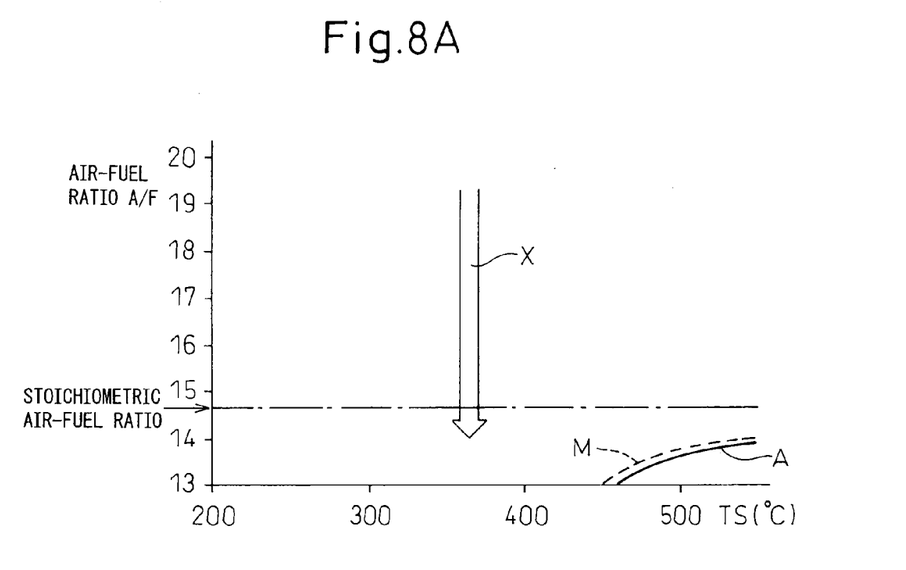
FIGS. 8A and 8B are views for explaining the minimum limit air-fuel ratio and minimum allowable air-fuel ratio of combustion gas.
Figure 8B:
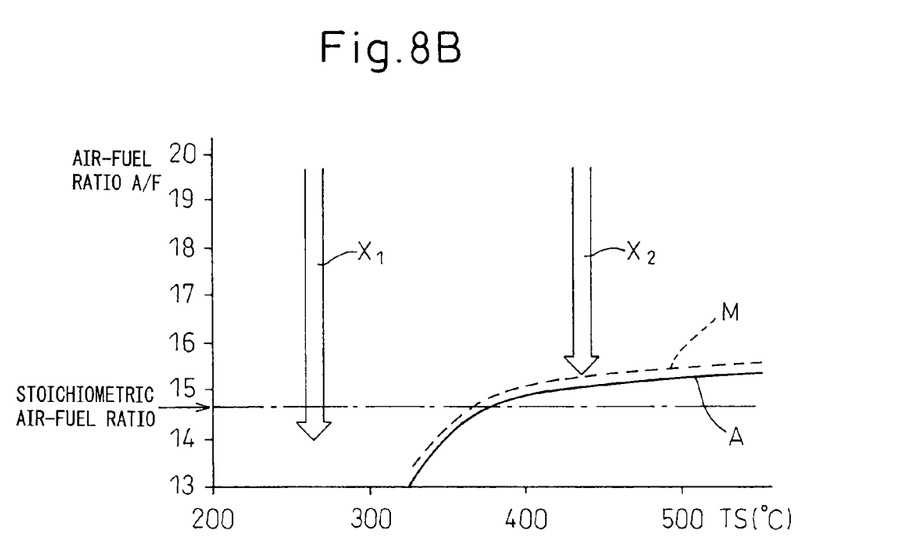

FIGS. 8A and 8B show the case of making the upper limit of the minimum limit air-fuel ratio A the minimum allowable air-fuel ratio M. Note that, FIG. 8A shows the case where the $SO_X$ trapped amount trapped by the $SO_X$ trap catalyst 13 is small, while FIG. 8B shows the case where the $SO_X$ trapped amount trapped by the $SO_X$ trap catalyst 13 is substantially the saturated state.

As will be understood from FIGS. 8A and 8B, the minimum allowable air-fuel ratio M becomes a function of the $SO_X$ trapped amount of the $SO_X$ trap catalyst 13 and the temperature TS of the $SO_X$ trap catalyst 13. This minimum allowable air-fuel ratio M increases from the rich air-fuel ratio to the lean air-fuel ratio as the $SO_X$ trapped amount of the $SO_X$ trap catalyst 13 increases. Further, the minimum allowable air-fuel ratio M shifts toward the low temperature side as the $SO_X$ trapped amount of the $SO_X$ trap catalyst 13 increases.

In the embodiment shown in FIGS. 8A and 8B, when the $SO_X$ trapped amount of the $SO_X$ trap catalyst 13 is small, as shown by the arrow X in FIG. 8A, when the $NO_X$ storing catalyst 15 should release $NO_X$, the air-fuel ratio A/F of the combustion gas is made constantly rich. Further, when the $SO_X$ trapped amount of the $SO_X$ trap catalyst 13 becomes larger, as shown in FIG. 8B by the arrow $X_1$, when the temperature TS of the $SO_X$ trap catalyst 13 is low and when the $NO_X$ storing catalyst 15 should release $NO_X$, the air-fuel ratio A/F of the combustion gas is made rich, while as shown in FIG. 8B by the arrow $X_2$, when the temperature TS of the $SO_X$ trap catalyst 13 is high, the air-fuel ratio A/F of the combustion gas A/F is lowered to the minimum allowable air-fuel ratio M. When in this way the drop in the air-fuel ratio A/F of the combustion gas is limited by the minimum allowable air-fuel ratio M, the fuel required for making the air-fuel ratio of the exhaust gas flowing into the $NO_X$ storing catalyst 15 rich is injected from the fuel feed valve 16.

The $SO_X$ trapped amount of the $SO_X$ trap catalyst 13 increases along with the elapse of time. Therefore, as will be understood from FIGS. 8A and 8B, in the present invention, when the $NO_X$ storing catalyst 15 should release $NO_X$, first, regardless of the temperature TS of the $SO_X$ trap catalyst 13, the air-fuel ratio A/F of the combustion gas is made rich, but as time passes, the air-fuel ratio A/F of the combustion gas is made rich in only part of the temperature region of the $SO_X$ trap catalyst 13.

In the embodiment shown in FIGS. 8A and 8B, as explained above, when the $SO_X$ trapped amount of the $SO_X$ trap catalyst 13 becomes greater, when, as shown in FIG. 8B by the arrow $X_2$, the temperature TS of the $SO_X$ trap catalyst 13 is high, the air-fuel ratio A/F of the combustion gas is lowered to the minimum allowable air-fuel ratio M. That is, when, if injecting the amount of auxiliary fuel required for making the air-fuel ratio of the exhaust gas flowing into the $NO_X$ storing catalyst 15 rich, the air-fuel ratio A/F of the combustion gas would fall to below the minimum allowable air-fuel ratio M, the amount of injection of the auxiliary fuel A is reduced to an amount such that the air-fuel ratio A/F of the combustion gas becomes the minimum allowable air-fuel ratio M.

As explained above, the $NO_X$ stored in the $NO_X$ storing catalyst 15 is released if the oxygen concentration in the stored exhaust gas falls. That is, to make the $NO_X$ storing catalyst 15 release the $NO_X$ well, it is necessary that the overall oxygen contained in the exhaust gas end up being consumed by the fed fuel. In this case, the overall oxygen contained in the exhaust gas can be consumed the most when burning fuel, so when making the $NO_X$ storing catalyst 15 release $NO_X$, it is preferable as much as possible to burn fuel so as to consume the oxygen contained in the exhaust gas. Therefore, in this embodiment, as shown by the arrow $X_2$ of FIG. 8, auxiliary fuel is burned to make the air-fuel ratio A/F of the combustion gas A/F fall as much as possible, that is, to the minimum allowable air-fuel ratio M.

Figure 9A:
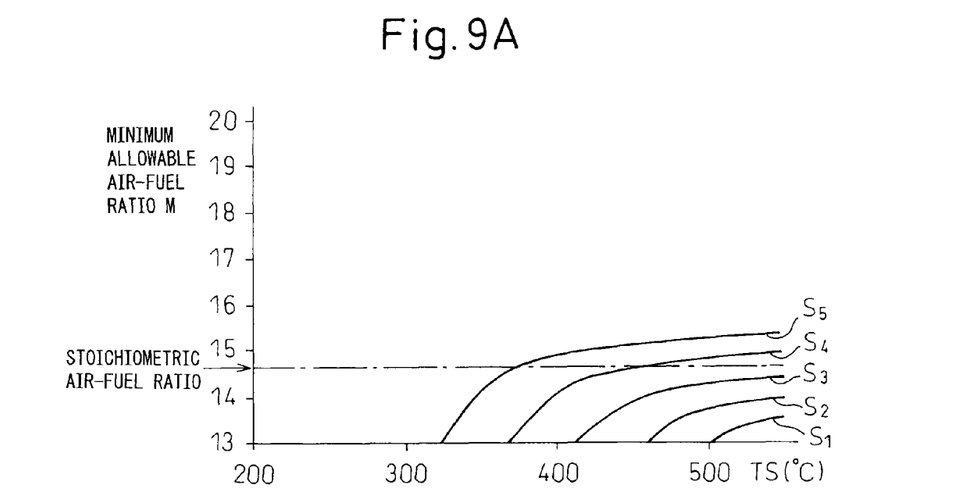
FIGS. 9A, 9B, and 9C are views for explaining the minimum allowable air-fuel ratio of combustion gas.
Figure 9B:
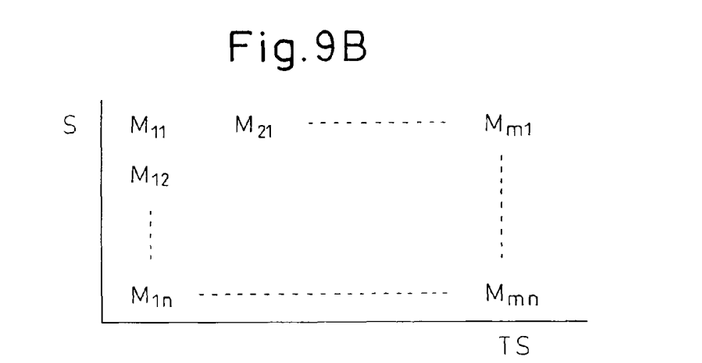

FIG. 9A shows the changes in the minimum allowable air-fuel ratio M with respect to typical $SO_X$ trapped amounts $S_1$ to $S_5$ ($S_1<S_2<S_3<S_4<S_5$) of the $SO_X$ trapped by the $SO_X$ trap catalyst 13 found by experiments. This minimum allowable air-fuel ratio M is stored as a function of the $SO_X$ trapped amount S of the $SO_X$ trap catalyst 13 and the temperature TS of the $SO_X$ trap catalyst 13 in the form of a map as shown in FIG. 9B in advance in the ROM 32.

Figure 9C:
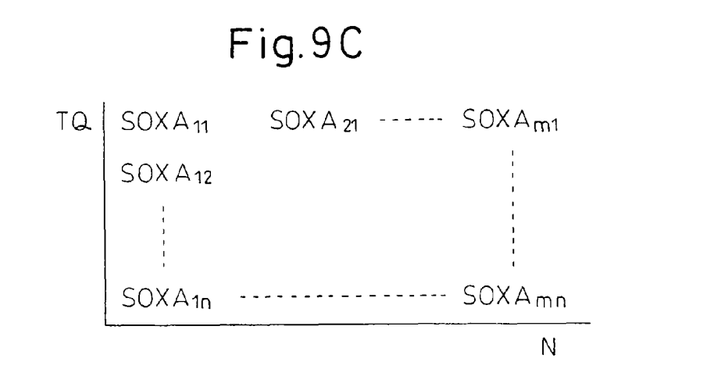

If explaining the $SO_X$ trapped amount S here, fuel contains a certain ratio of sulfur. Therefore, the $SO_X$ amount contained in the exhaust gas, that is, the $SO_X$ amount trapped in the $SO_X$ trap catalyst 13, is proportional to the fuel injection amount. The fuel injection amount is a function of the required torque and engine speed. Therefore, the $SO_X$ amount trapped in the $SO_X$ trap catalyst 13 also becomes a function of the required torque and engine speed. In this embodiment of the present invention, the $SO_X$ amount SOXA trapped in the $SO_X$ trap catalyst 13 per unit time is stored as a function of the required torque TQ and engine speed N in the form of a map such as shown in FIG. 9C in advance in the ROM 32. By cumulatively adding this $SO_X$ amount SOXA, the $SO_X$ trapped amount S is calculated.

Figure 10:
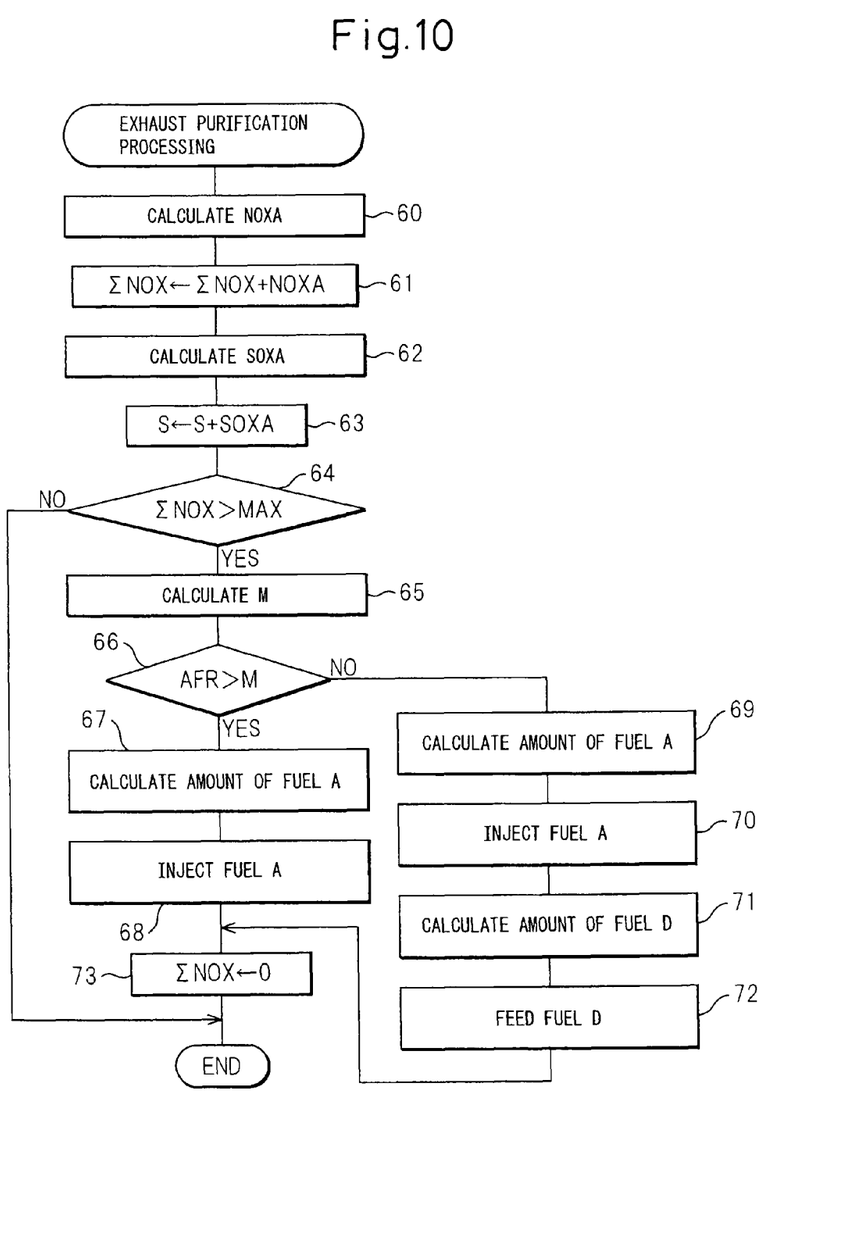
FIG. 10 is a flow chart for exhaust purification processing.

FIG. 10 shows an exhaust purification processing routine. This routine is executed by interruption every predetermined time period.

Figure 11:
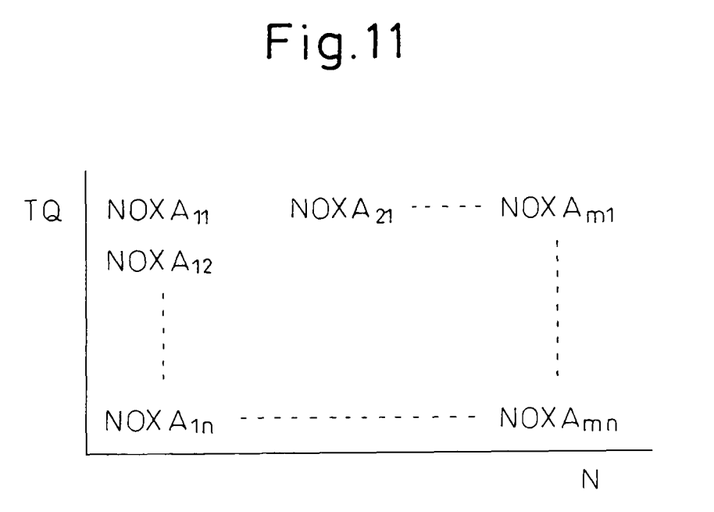
FIG. 11 is a view showing a map of a stored $NO_X$ amount NOXA.

Referring to FIG. 10, first, at step 60, the $NO_X$ amount NOXA stored per unit time in the $NO_X$ storing catalyst 15 is calculated. This $NO_X$ amount NOXA is stored as a function of the required torque TQ and engine speed N in the form of a map shown in FIG. 11 in advance in the ROM 32. Next, at step 61, this NOXA is added to the $NO_X$ amount ΣNOX stored in the $NO_X$ storing catalyst 15. Next, at step 62, the $SO_X$ amount SOXA trapped per unit time is calculated from the map shown in FIG. 9C. Next, at step 63, this SOXA is added to the $SO_X$ trapped amount S trapped at the $SO_X$ trap catalyst 13.

Next, at step 64, it is determined if the stored $NO_X$ amount ΣNOX has exceeded an allowable value MAX. When ΣNOX>MAX, the routine proceeds to step 65 where the air-fuel ratio of the exhaust gas flowing into the $NO_X$ storing catalyst 15 is switched temporarily from lean to rich in rich processing. That is, at step 65, the minimum allowable air-fuel ratio M is calculated from the map shown in FIG. 9B, Next, at step 66, it is determined if the target rich air-fuel ratio AFR predetermined for release of $NO_X$ is larger than the minimum allowable air-fuel ratio M.

When the target rich air-fuel ratio AFR is larger than the minimum allowable air-fuel ratio M, that is, even if making the air-fuel ratio A/F of the combustion gas the target rich air-fuel ratio AFR, when $SO_X$ will not be released from the $SO_X$ trap catalyst 13, the routine proceeds to step 67 where the amount of auxiliary fuel A required for making the air-fuel ratio A/F of the combustion gas the target rich air-fuel ratio AFR is calculated. Next, at step 68, processing is performed for the fuel injector 3 to inject auxiliary fuel A. Next, at step 73, ΣNOX is cleared.

As opposed to this, at step 66, when it is judged that the target rich air-fuel ratio AFR is smaller than the minimum allowable air-fuel ratio M, that is, if making the air-fuel ratio A/F of the combustion gas the target rich air-fuel ratio AFR, when the $SO_X$ trap catalyst 13 releases $SO_X$, the routine proceeds to step 69 where the amount of auxiliary fuel A required for making the air-fuel ratio A/F of the combustion gas the minimum allowable air-fuel ratio M is calculated. Next, at step 70, processing is performed for the fuel injector 3 to inject auxiliary fuel A.

Next, at step 71, the amount of feed of the fuel B from the fuel feed valve 16 required for making the air-fuel ratio of the exhaust gas flowing into the $NO_X$ storing catalyst 15 the target rich air-fuel ratio AFR is calculated. Next, at step 72, processing is performed for the fuel feed valve 16 to feed the fuel B. Next, the routine proceeds to step 73.

REFERENCE SIGNS LIST

4 . . . intake manifold
5 . . . exhaust manifold
7 . . . exhaust turbocharger
13 . . . $SO_X$ trap catalyst
15 . . . exhaust purification catalyst
16 . . . fuel feed valve

The invention claimed is:

1. An exhaust purification device of an internal combustion engine arranging in an engine exhaust passage an $SO_X$ trap catalyst for trapping $SO_X$ contained in exhaust gas and arranging in the exhaust passage downstream of the $SO_X$ trap catalyst an exhaust purification catalyst, wherein said device is provided with an auxiliary fuel injecting means for injecting auxiliary fuel into a combustion chamber at a combustible timing after completion of injection of fuel into the combustion chamber for generating engine output, a minimum allowable air-fuel ratio comprised of an air-fuel ratio of a combustion gas in the combustion chamber falling when an auxiliary fuel is injected and where $SO_X$ trapped in the $SO_X$ trap catalyst is not released is found in advance, when the air-fuel ratio of the combustion gas will not fall to the minimum allowable air-fuel ratio even when injecting an amount of auxiliary fuel required for a purification processing of the exhaust purification catalyst, the required amount of auxiliary fuel is injected, and when the air-fuel ratio of the combustion gas will fall to below the minimum allowable air-fuel ratio when injecting the amount of auxiliary fuel required for the purification processing of the exhaust purification catalyst, the injected amount of auxiliary fuel is reduced from the required amount to prevent the air-fuel ratio of the combustion gas from falling to below the minimum allowable air-fuel ratio.

2. An exhaust purification device of an internal combustion engine as claimed in claim 1, wherein an injection timing of the auxiliary fuel is a timing within a range of 90 degrees after compression top dead center where the auxiliary fuel does not contribute much at all to generation of engine output.

3. An exhaust purification device of an internal combustion engine as claimed in claim 1, wherein when the amount of injection of said auxiliary fuel is reduced from said required amount, the amount of decrease of fuel is fed between the $SO_X$ trap catalyst and exhaust purification catalyst in the exhaust passage.

4. An exhaust purification device of an internal combustion engine as claimed in claim 1, wherein said $SO_X$ trap catalyst traps $SO_X$ contained in the exhaust gas when the air-fuel ratio of the exhaust gas flowing into the $SO_X$ trap catalyst is lean, and the $SO_X$ trap catalyst has a property that, when the temperature of the $SO_X$ trap catalyst rises under the lean air-fuel ratio of the exhaust gas, the $SO_X$ trapped gradually diffuses to an inside of the $SO_X$ trap catalyst.

5. An exhaust purification device of an internal combustion engine as claimed in claim 1, wherein said minimum allowable air-fuel ratio is stored in advance as a function of the $SO_X$ trapped amount of the $SO_X$ trap catalyst and the temperature of the $SO_X$ trap catalyst.

6. An exhaust purification device of an internal combustion engine as claimed in claim 5, wherein said minimum allowable air-fuel ratio increases from a rich air-fuel ratio to a lean air-fuel ratio as the $SO_X$ trapped amount of the $SO_X$ trap catalyst increases.

7. An exhaust purification device of an internal combustion engine as claimed in claim 1, wherein said exhaust purification catalyst is comprised of an $NO_X$ storing catalyst which stores $NO_X$ contained in the exhaust gas when the air-fuel ratio of the inflowing exhaust gas is lean and which releases the stored $NO_X$ when the air-fuel ratio of the inflowing exhaust gas becomes the stoichiometric air-fuel ratio or rich; even if injecting the amount of the auxiliary fuel necessary for making the air-fuel ratio of the exhaust gas flowing into the $NO_X$ storing catalyst rich for making the $NO_X$ storing catalyst release $NO_X$, when the air-fuel ratio of the combustion gas will not fall to the minimum allowable air-fuel ratio, the required amount of said auxiliary fuel is injected to make said air-fuel ratio of the combustion gas rich; and, if injecting the amount of the auxiliary fuel necessary for making the air-fuel ratio of the exhaust gas flowing into the $NO_X$ storing catalyst rich for making the $NO_X$ storing catalyst release $NO_X$, when the air-fuel ratio of the combustion gas will fall to below the minimum allowable air-fuel ratio, the injected amount of said auxiliary fuel is reduced from the required amount to prevent said air-fuel ratio of the combustion gas from falling to below said minimum allowable air-fuel ratio.

8. An exhaust purification device of an internal combustion engine as claimed in claim 7, wherein a fuel feed valve is arranged between the $SO_X$ trap catalyst and the $NO_X$ storing catalyst in the engine exhaust passage, and, when the injected amount of said auxiliary fuel is reduced from the required amount, the amount of decrease of the fuel is fed from said fuel feed valve.

9. An exhaust purification device of an internal combustion engine as claimed in claim 7, wherein if injecting the required amount of auxiliary fuel, when the air-fuel ratio of the combustion gas would fall to below the minimum allowable air-fuel ratio, the injected amount of the auxiliary fuel is reduced to an amount such that said air-fuel ratio of the combustion gas becomes said minimum allowable air-fuel ratio.

* * * * *